United States Patent
Hu et al.

(10) Patent No.: US 11,256,890 B2
(45) Date of Patent: *Feb. 22, 2022

(54) DATA STORING AND SHARING USING TWO-DIMENSIONAL CODES

(71) Applicant: Advanced New Technologies Co., Ltd., Grand Cayman (KY)

(72) Inventors: Xingjiang Hu, Hangzhou (CN); Xiaoyu Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/220,784

(22) Filed: Apr. 1, 2021

(65) Prior Publication Data
US 2021/0224497 A1    Jul. 22, 2021

Related U.S. Application Data

(63) Continuation of application No. 16/804,669, filed on Feb. 28, 2020, now Pat. No. 10,984,206, which is a
(Continued)

(30) Foreign Application Priority Data

Apr. 16, 2019  (CN) .......................... 201910304751.5

(51) Int. Cl.
   *G06K 7/14*   (2006.01)
   *G06K 19/06*  (2006.01)

(52) U.S. Cl.
   CPC ..... *G06K 7/1417* (2013.01); *G06K 19/06037* (2013.01)

(58) Field of Classification Search
   CPC ........... G06K 7/1417; G06K 19/06037; G06Q 20/3274; G06Q 20/3276; G06Q 30/06; G06Q 20/386
   See application file for complete search history.

(56) References Cited

U.S. PATENT DOCUMENTS

| | | |
|---|---|---|
| 2013/0200145 A1 | 8/2013 | Cameron |
| 2013/0240618 A1* | 9/2013 | Hall ...................... G06F 16/954 235/375 |

(Continued)

FOREIGN PATENT DOCUMENTS

| | | |
|---|---|---|
| CN | 107203877 | 9/2017 |
| CN | 107612820 | 1/2018 |

(Continued)

OTHER PUBLICATIONS

A. S. Krishnakunnar and S. Yajnik, "Seamless session mobility using short range communication technologies," 2014 IEEE International Conference on Communications (ICC), Sydney, NSW, 2014, pp. 1754-1759. (Year: 2014).

(Continued)

*Primary Examiner* — Sonji N Johnson
(74) *Attorney, Agent, or Firm* — Fish & Richardson P.C.

(57) ABSTRACT

The present application provides a data sharing solution. In the solution, a first application running on a first user equipment uploads shared data, and a shared device generates a two-dimensional code for the shared data and returns the two-dimensional code to the first application. The first application can provide the two-dimensional code to a second application running on a second user equipment. After scanning the two-dimensional code, the second application can send a data obtaining request to the shared device based on the scanned information, so the shared device sends the shared data corresponding to the two-dimensional code to the second application based on the request, thereby completing cross-application data sharing. The process offers convenient data transfer for the user and also breaks through limitations of data compatibility between the different APPs and alleviates a problem that information between the different APPs cannot be mutually identified.

18 Claims, 5 Drawing Sheets

Related U.S. Application Data continuation of application No. PCT/CN2020/072064, filed on Jan. 14, 2020.

(56) References Cited

U.S. PATENT DOCUMENTS

| | | | |
|---|---|---|---|
| 2014/0203071 A1 | 7/2014 | Eggert | |
| 2016/0247410 A1* | 8/2016 | Jandard | G09B 5/06 |
| 2018/0330459 A1* | 11/2018 | Elder | G06Q 20/3674 |
| 2018/0343290 A1* | 11/2018 | Gora | H04L 65/4015 |
| 2020/0334433 A1 | 10/2020 | Hu et al. | |

FOREIGN PATENT DOCUMENTS

| | | |
|---|---|---|
| CN | 107690085 | 2/2018 |
| CN | 107833039 | 3/2018 |
| CN | 109003194 | 12/2018 |
| CN | 110245304 | 9/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/072064, dated Apr. 15, 2020, 21 pages (with machine translation).

\* cited by examiner

DATA STORING AND SHARING USING TWO-DIMENSIONAL CODES

CROSS-REFERENCE TO RELATED APPLICATIONS

This application is a continuation of U.S. patent application Ser. No. 16/804,669, filed Feb. 28, 2020, which is a continuation of PCT Application No. PCT/CN2020/072064, filed on Jan. 14, 2020, which claims priority to Chinese Patent Application No. 201910304751.5, filed on Apr. 16, 2019, and each application is hereby incorporated by reference in its entirety.

TECHNICAL FIELD

The present application relates to the field of information technologies, and in particular, to data sharing methods and apparatuses, and computer readable medium

BACKGROUND

Within computing applications, sharing information, including data or links to other sources of data, is a part of the user experience. For example, a user may wish to share a link of a shopping application (APP) by using an instant messaging APP, the instant messaging APP may not allow, for some reasons, the user to send the link of the shopping APP, and therefore data cannot be shared between users. In some cases, sharing information can take place over multiple APPs as cross APP data sharing.

While there is a solution for implementing data sharing by using tokens, such as Tao Token of TAOBAO APP and Zhi Token of ALIPAY APP, exists, there are still many problems in this token sharing solution. For example, the user frequently switches between APPs on the device and needs to copy and paste the character string. The solution of Tao Token is used as an example. When the user needs to share a link of TAOBAO APP, the user generates a corresponding Tao Token on TAOBAO APP based on a link to be shared. The Tao Token is essentially a character string generated based on the link and can be copied to a memory clipboard of a terminal device, and the Tao Token can be sent to another user by using another instant messaging APP. Because the instant messaging APP cannot identify the Tao Token, when another user receives the Tao Token by using the instant messaging APP, the other user needs to copy the Tao Token to the memory clipboard of the terminal device, and then opens TAOBAO APP. TAOBAO APP identifies a character string of the Tao Token in the memory clipboard, and automatically opens the link that needs to be shared, so as to wake content shared by the user and achieve a purpose of cross-APP data sharing. This operation is complex, and user experience is poor.

SUMMARY

An implementation of the present application provides a data sharing method implemented on a shared device side. The method includes: obtaining, by the shared device, shared data from a first application, and generating a two-dimensional code for the shared data, where the first application runs on a first user equipment; sending, by the shared device, the two-dimensional code to the first application; obtaining, by the shared device, a data obtaining request from a second application, where the second application runs on a second user equipment, and the data obtaining request is generated after the second application scans a two-dimensional code provided by the first application; and sending, by the shared device, shared data corresponding to the two-dimensional code to the second application based on the data obtaining request.

An implementation of the present application further provides a data sharing method implemented on a first user equipment side, where a first application runs on the first user equipment, and the method includes: sending, by the first application, shared data to a shared device; obtaining, by the first application, a two-dimensional code for the shared data from the shared device; and providing, by the first application, the two-dimensional code for a second application, so after scanning the two-dimensional code, the second application sends a data obtaining request to the shared device, and obtains the shared data corresponding to the two-dimensional code from the shared device.

An implementation of the present application further provides a data sharing method implemented on a second user equipment side, where a second application runs on the second user equipment, and the method includes: scanning, by the second application, a two-dimensional code provided by a first application, where the two-dimensional code is generated by a shared device based on shared data provided by the first application; sending, by the second application, a data obtaining request to the shared device based on the scanned two-dimensional code, so the shared device sends the shared data corresponding to the two-dimensional code to the second application based on the data obtaining request; and obtaining, by the second application, the shared data corresponding to the two-dimensional code from the shared device.

In addition, an implementation of the present application provides a shared device, and the device includes: an encoding module, configured to generate a two-dimensional code for shared data; a receiving module, configured to obtain shared data from a first application and a data obtaining request from a second application, where the first application runs on a first user equipment, the second application runs on a second user equipment, and the data obtaining request is generated after the second application scans a two-dimensional code provided by the first application; a sending module, configured to send the two-dimensional code to the first application, and send the shared data corresponding to the two-dimensional code to the second application based on the data obtaining request; and a storage module, configured to store the shared data.

Some implementations of the present application further provide a computing device, where the device includes a memory configured to store computer program instructions and a processor configured to execute the computer program instructions, and when the computer program instructions are executed by the processor, the device is triggered to perform the previous data sharing method.

Some other implementations of the present application further provide a computer readable medium on which computer program instructions are stored, and the computer program instructions can be executed by a processor to implement the data sharing method.

In the solutions provided in the implementations of the present application, the first application running on the first user equipment first sends the shared data to the shared device for storage, and the shared device generates the two-dimensional code for the shared data and returns the two-dimensional code to the first application. The first application can provide the two-dimensional code to the second application running on the second user equipment.

After scanning the two-dimensional code, the second application can send the data obtaining request to the shared device based on the scanned information, so the shared device sends the shared data corresponding to the two-dimensional code to the second application based on the request, thereby completing cross-application data sharing. In the sharing process, a user does not need to frequently perform copy and paste operations and switch between APPs. In addition, a shared device completes generation of a broadcast carrier (that is, a two-dimensional code) of shared data, storage of shared data, and sending of shared data. Therefore, different APPs use a common information model of the shared device, which can break through a limitation of data compatibility between the different APPs and alleviate a problem that information between the different APPs cannot be mutually identified.

BRIEF DESCRIPTION OF DRAWINGS

Other features, objectives, and advantages of the present application become clearer by reading detailed description of the non-limitative implementations with reference to the following accompanying drawings.

Same or similar reference numerals in the accompanying drawings represent same or similar components.

DESCRIPTION OF IMPLEMENTATIONS

The following describes the implementations of the present application in detail with reference to accompanying drawings.

In a typical configuration of the present application, a terminal and a service network device each include one or more central processing units (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program apparatus, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device.

An implementation of the present application provides a data sharing method. In a process of implementing data sharing by using the method, a user does not need to frequently perform copy and paste operations and switch between APPs. In addition, a shared device completes generation of a broadcast carrier (that is, a two-dimensional code) of shared data, storage of shared data, and sending of shared data. Therefore, different APPs use a common information model of the shared device, which can break through a limitation of data compatibility between the different APPs and alleviate a problem that information between the different APPs cannot be mutually identified.

Figure 1:
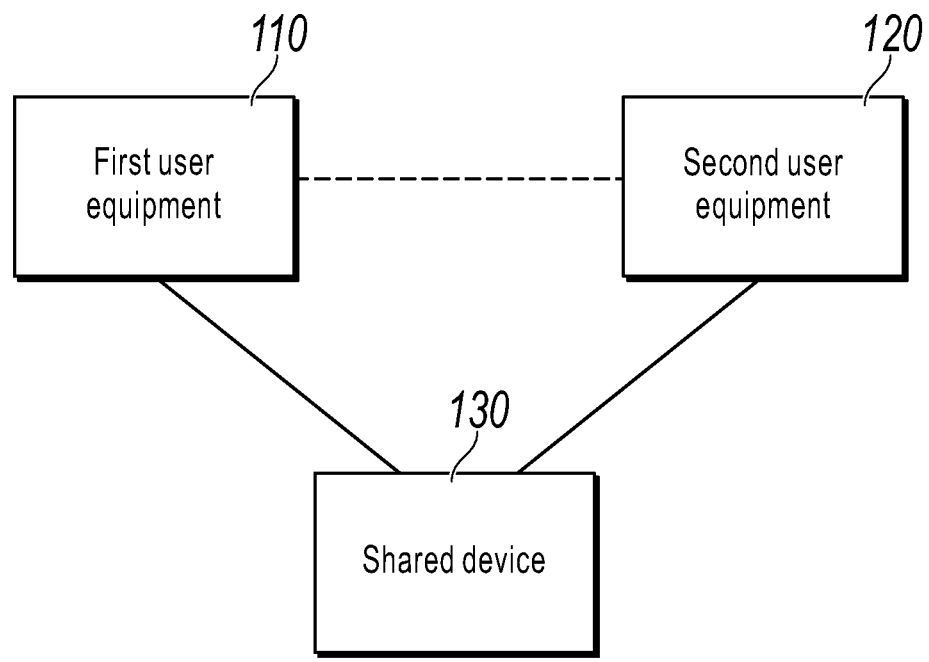
FIG. 1 is a schematic diagram illustrating an interaction relationship between devices involved in implementing a data sharing method, according to an implementation of the present application.

FIG. 1 is a schematic diagram illustrating an interaction relationship between devices involved in implementing a data sharing method, according to an implementation of the present application. The devices include a first user equipment 110, a second user equipment 120, and a shared device 130. A first application runs on the first user equipment 110, and a second application runs on the second user equipment 120. When the first application on the first user equipment 110 needs to share data to the second application on the second user equipment 120, data sharing can be implemented by using the shared device 130. The first user equipment and the second user equipment can include but are not limited to various terminal devices such as a personal computer, a smartphone, a tablet computer, and can run various APPs. The first application and the second application can be the same APP, or can be different APPs. The shared device can be a device running on a network side. The shared device is connected to the first user equipment and the second user equipment by using a network. The shared device includes but is not limited to a network host, a single network server, a cluster of multiple network servers, or a cloud computing-based computer cluster. Here, the cloud includes a large number of hosts or network servers based on cloud computing. The cloud computing is a type of distributed computing, and is a virtual computer including a group of loosely coupled computer clusters. When a user needs to share data, the user can use a running APP on a terminal device and the shared device to implement data sharing.

Figure 2:
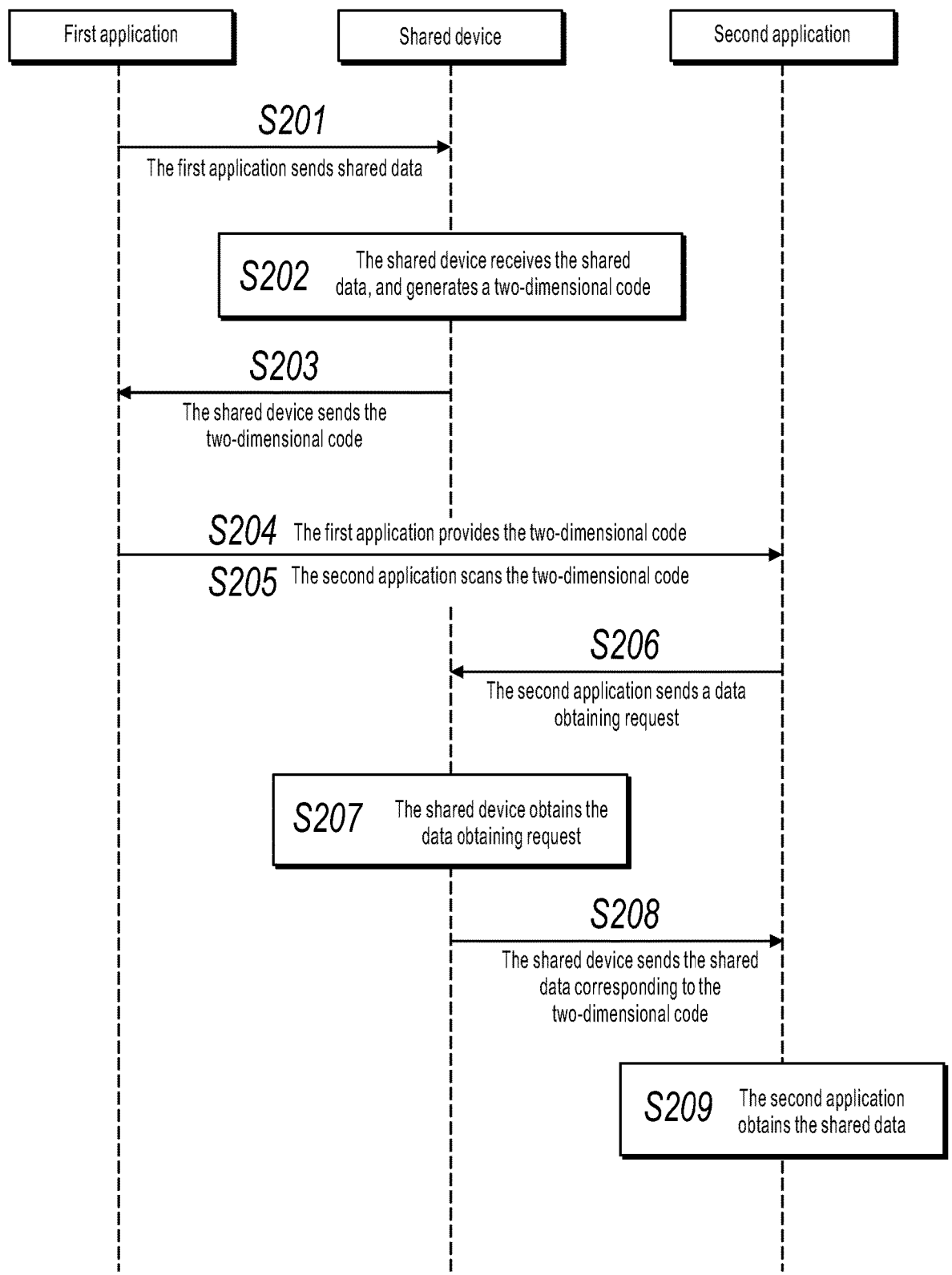
FIG. 2 is a flowchart illustrating data interaction between devices at the time of implementing data sharing, according to an implementation of the present application.

FIG. 2 shows a data interaction procedure between devices during data sharing, including the following processing steps:

Step S201: A first application running on a first user equipment sends shared data to a shared device. The shared data can be data generated by the first application, or data generated by another application running on the first user equipment and obtained by the first application based on a corresponding permission, or can be data sent by an application on another user equipment to the first application. A form of the shared data can be any type that can be identified by the device, for example, an image, text, video, and audio. For example, if the first application is a shopping application, the shared data can be purchase page information of a product generated by the first application. If the first user equipment has a photographing function, the shared data can be image information photographed by a photographing module of the first user equipment invoked by the first application.

In actual scenarios, the first user equipment or the first application can provide a trigger mechanism for sending behavior, so the first application sends the shared data to the shared device when a trigger condition is met. For example, a user interaction interface of the first application can provide a sharing key. After selecting data that needs to be shared, a user can click the sharing key to upload the selected data to the shared device as the shared data. In addition, the trigger condition of sending behavior can be an operation gesture entered by the user on the interaction interface, a specific motion track made by moving the first user equipment, etc. This is not specifically limited in this implementation.

Step S202: The shared device obtains the shared data from the first application, and generates a two-dimensional code for the shared data. The shared data from the first application is stored in a storage module of the shared device, so the shared data is provided to a second application when a data obtaining request of the second application is received.

In some implementations of the present application, when obtaining the shared data from the first application, the shared device can first determine whether the same shared data already exists on the shared device. For example, another user has uploaded the same picture when sharing data. In this case, a determining result is yes. Then, actual data transmission may not be performed between the first application and the shared device, and the existing picture is directly used as the current shared data to generate the two-dimensional code. If the determining result is no, the picture is received from the first application in a normal data transmission way as the current shared data for storage, and the two-dimensional code is generated based on the received shared data, thereby alleviating repeated storage of the same data and saving storage space.

In actual scenarios, when determining whether the same shared data already exists, the first application can first send a unique identifier of the shared data, such as a hash value, to the shared device. After receiving the unique identifier, the shared device compares the unique identifier with a unique identifier of the existing data, so as to obtain a determining result. Because a data volume of the unique identifier is relatively small, the determining result can be obtained by using only a relatively small amount of data for exchanging in the entire determining process, thereby saving bandwidth and improving efficiency.

Step S203: After generating the two-dimensional code, the shared device sends the two-dimensional code to the first application.

Step S204: The first application provides the two-dimensional code for the second application. In this implementation of the present application, the two-dimensional code can be provided directly or indirectly.

A method of directly providing the two-dimensional code includes displaying the two-dimensional code on a screen of the first user equipment, or sending, by the first application, the two-dimensional code to the second user equipment by using a network, so the second application on the second user equipment can read the two-dimensional code, etc. A method of indirectly providing the two-dimensional code can be that the first application outputs the two-dimensional code to other carriers in various ways, for example, prints the two-dimensional code on the paper, so the second application can scan the two-dimensional code on the paper. Here, a person skilled in the art should understand that the previous methods for providing the two-dimensional code are used only as examples. If other existing or future possible methods for providing the two-dimensional code are applicable to the present application, the other methods shall fall within the protection scope of the present application, which is incorporated here by reference.

Step S205: The second application scans the two-dimensional code provided by the first application. The second application can invoke a camera permission on the second user equipment to enable a camera to scan the two-dimensional code displayed on the screen of the first user equipment.

Step S206: The second application sends a data obtaining request to the shared device based on the scanned two-dimensional code. Information about the two-dimensional code includes necessary information for obtaining the shared data from the shared device, for example, can be a storage address of the shared data stored on the shared device, or a data read interface address of the shared device and query information of the data. Based on the necessary information included in the two-dimensional code, the second application can automatically send the data obtaining request to the shared device, so as to obtain the shared data corresponding to the two-dimensional code.

Step S207: The shared device obtains the data obtaining request from the second application.

Step S208: The shared device sends the shared data corresponding to the two-dimensional code to the second application based on the data obtaining request. Based on the information included in the data obtaining request, the shared device can find the shared data corresponding to the two-dimensional code, and send the shared data to the second application after finding the shared data.

Step S209: The second application obtains the shared data corresponding to the two-dimensional code, so as to complete a data sharing process. In the entire process, both a sharing initiator and a sharing acceptor can directly complete an operation in one APP, without switching the APP and pasting copied information. In addition, in this process, generation of the two-dimensional code and storage and sending of the shared data are all completed by the shared device. Therefore, specific data storage and transmission form are not related to the APP. A common information model of the shared device is shared between APPs for sharing, which can break through a limitation of data compatibility between different APPs and alleviate a problem that information between the different APPs cannot be mutually identified.

In some implementations of the present application, the first application can further send source information of the shared data to the shared device, so the shared device records the source information of the shared data. Correspondingly, when further obtaining the shared data from the first application, the shared device further records the source information of the shared data. The source information is used to mark a source of shared data each time the data is shared. For example, the source information can be used to mark a user equipment and an application from which the current shared data comes.

Based on this, after determining whether the same shared data already exists on the shared device, if the same shared data does not exist, the shared device can receive and store the shared data from the first application based on a normal processing procedure, and record the source information of the shared data. When the same shared data exists, the shared device does not need to receive and store the shared data, and generates only one data record, including an index that points to the same shared data that already exists and current source information. For example, when the first application A of the first user equipment S needs to share picture p1 with the second application B of the second user equipment T, if picture p1 already exists on the shared device, the shared device does not need to receive picture p1 from the first application A, and only needs to add one data record. The data record includes at least the following content: an identifier (or index information) of picture p1, a source device S, and a source application A.

Therefore, when sending the shared data corresponding to the two-dimensional code to the second application based on the data obtaining request, the shared device can further send the source information of the shared data corresponding to the two-dimensional code to the second application, so the second application can also obtain the source information of the shared data. When the second application obtains the shared data, the source information of the shared data can be displayed. Therefore, a user of the second application can clearly know the source of the shared data.

Figure 3:
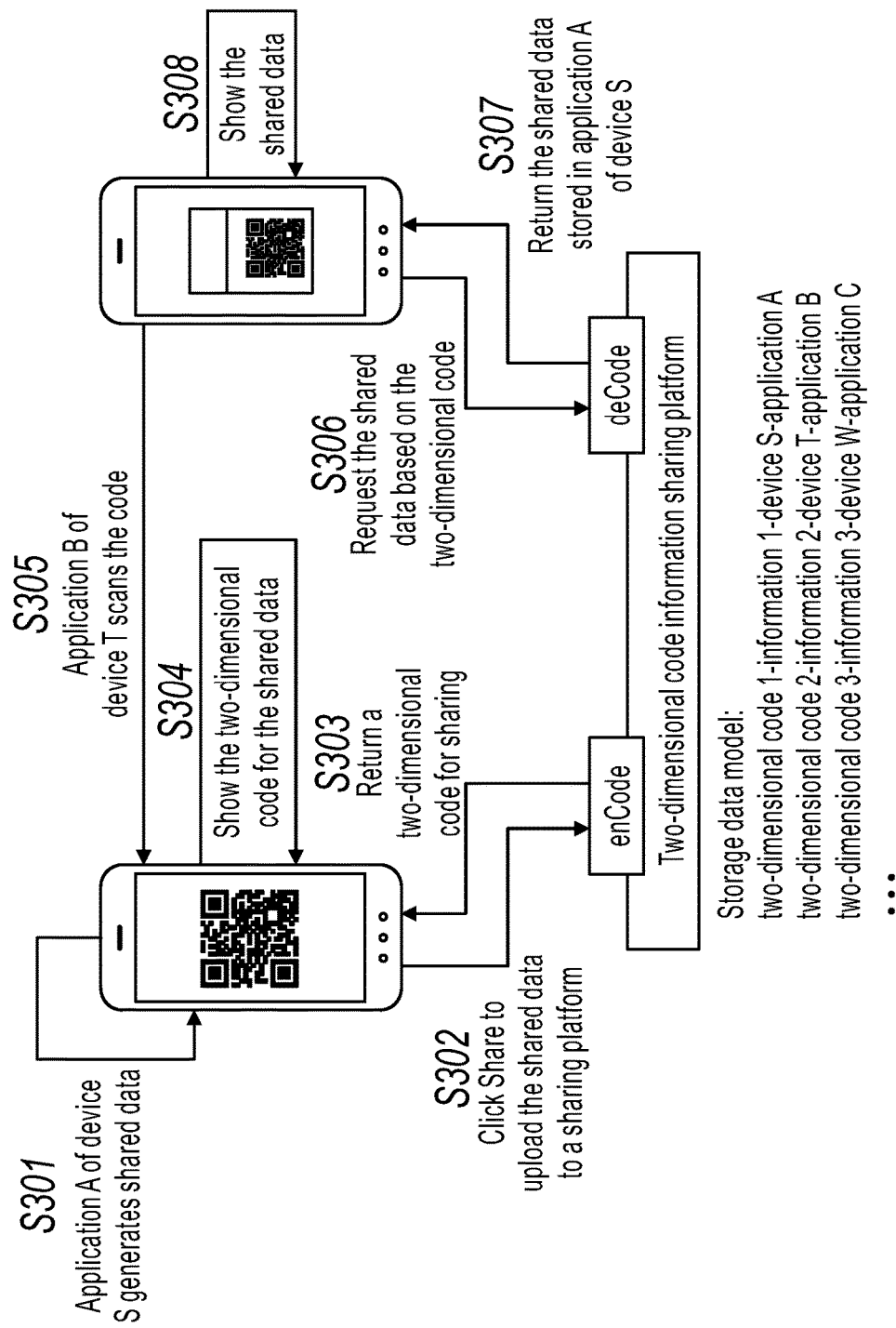
FIG. 3 is a schematic interaction diagram when a solution provided in an implementation of the present application is applied to a data sharing scenario.

FIG. 3 is a schematic interaction diagram when a solution provided in an implementation of the present application is applied to a data sharing scenario. In this scenario, data is shared from application A of device S to application B of device T. A two-dimensional code information sharing platform serves as a shared device. An interaction process includes the following processing steps:

Step S301: Application A of device S generates shared data.

Step S302: A user clicks "Share" on an interaction interface of application A, and uploads the shared data to the two-dimensional code information sharing platform.

Step S303: The two-dimensional code information sharing platform encodes the shared data, stores the data, stores the data on a remote server, and returns a shared two-dimensional code to application A of device S. A unified data storage model can be used for data storage, and the data includes the following information: a two-dimensional code, shared data, a source device, and a source application. Therefore, a form in which each piece of shared data is stored in the two-dimensional code information sharing platform can be as follows:
two-dimensional code 1-data 1-device S-application A
two-dimensional code 2-data 2-device T-application B
two-dimensional code 3-data 3-device W-application C
. . . .

Step S304: Application A of device S displays the two-dimensional code.

Step S305: Application B of device T scans the two-dimensional code.

Step S306: Application B of device T requests the shared data from the two-dimensional code information sharing platform based on information in the scanned two-dimensional code.

Step S307: After decoding the stored shared data, the two-dimensional code information sharing platform returns the shared data stored in application A of device S to application B of device T.

Step S308: Application B of device T displays the data shared by application A of device S and obtained by scanning the two-dimensional code.

Based on the same inventive concept, an implementation of the present application further provides a shared device for implementing data sharing. A method corresponding to the device is the data sharing method implemented on the shared device in the previous implementation, and a problem solving principle of the device is similar to that of the method.

Figure 4:
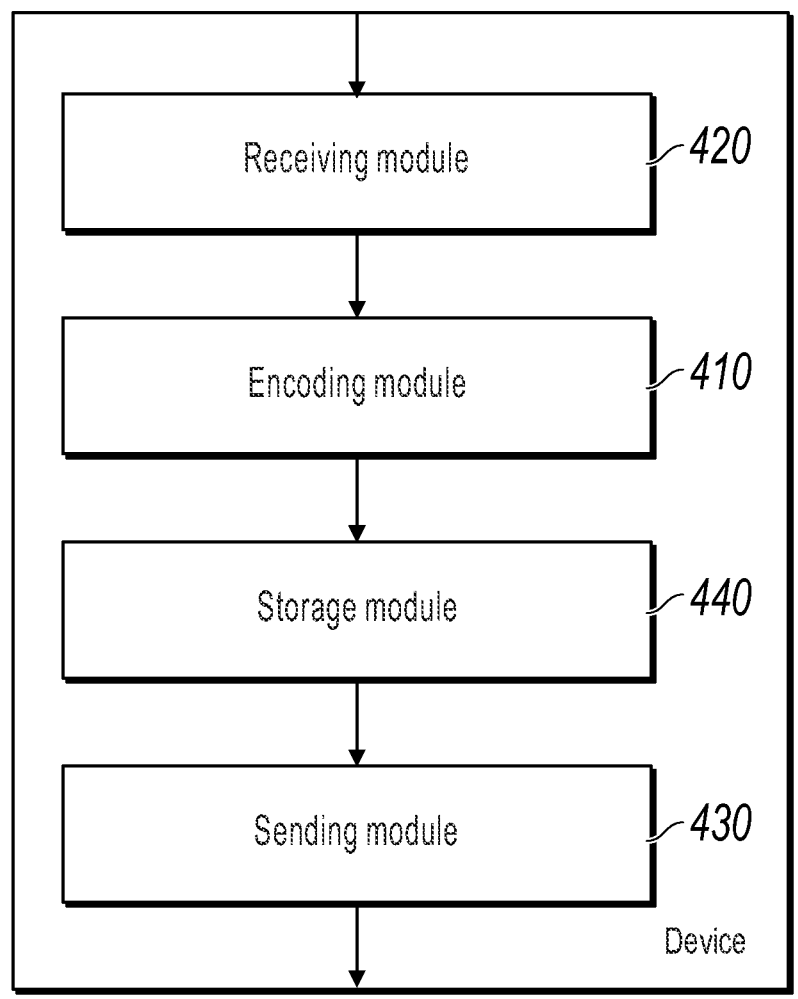
FIG. 4 is a schematic structural diagram illustrating a shared device, according to an implementation of the present application.

FIG. 4 shows a structure of a shared device according to an implementation of the present application. The device includes an encoding module 410, a receiving module 420, a sending module 430, and a storage module 440. The encoding module 410 is configured to generate a two-dimensional code for shared data. The receiving module 420 is configured to obtain shared data from a first application and a data obtaining request from a second application. The sending module 430 is configured to send the two-dimensional code to the first application, and send the shared data corresponding to the two-dimensional code to the second application based on the data obtaining request. The storage module 440 is configured to store the shared data, so the shared device provides the shared data to the second application when receiving the data obtaining request of the second application.

In some implementations of the present application, when the shared device obtains the shared data from the first application, the receiving module can first determine whether the same shared data already exists on the shared device. For example, another user has uploaded the same picture when sharing data. In this case, a determining result is yes. Then, actual data transmission may not be performed between the first application and the shared device, and the existing picture is directly used as the current shared data to generate the two-dimensional code. If the determining result is no, the receiving module receives the picture from the first application in a normal data transmission way as the current shared data for storage in the storage module, and the encoding module generates the two-dimensional code based on the received shared data, thereby alleviating repeated storage of the same data and saving storage space.

In actual scenarios, when the receiving module determines whether the same shared data already exists, the first application can first send a unique identifier of the shared data, such as a hash value, to the shared device. After receiving the unique identifier, the receiving module of the shared device compares the unique identifier with a unique identifier of the existing data, so as to obtain a determining result. Because a data volume of the unique identifier is relatively small, the determining result can be obtained by using only a relatively small amount of data for exchanging in the entire determining process, thereby saving bandwidth and improving efficiency.

When receiving the data obtaining request from the second application, the shared device can find the shared data corresponding to the two-dimensional code based on the information included in the data obtaining request, and after finding the shared data, send the shared data to the second application by using the sending module, so as to complete the data sharing process. In the entire process, both a sharing initiator and a sharing acceptor can directly complete the operations in one APP, without switching the APP and pasting copied information. In addition, in this process, generation of the two-dimensional code and storage and sending of the shared data are all completed by the shared device. Therefore, specific data storage and transmission form are not related to the APP. A common information model of the shared device is shared between APPs for sharing, which can break through a limitation of data compatibility between different APPs and alleviate a problem that information between the different APPs cannot be mutually identified.

In some implementations of the present application, the first application can further send source information of the shared data to the shared device, so the shared device records the source information of the shared data. Correspondingly, when further obtaining the shared data from the first application, the shared device further records the source information of the shared data. The source information is used to mark a source of shared data each time the data is shared. For example, the source information can be used to mark a user equipment and an application from which the current shared data comes.

Based on this, after determining whether the same shared data already exists on the shared device, if the same shared data does not exist, the shared device can receive and store the shared data from the first application based on a normal processing procedure, and record the source information of the shared data. When the same shared data exists, the shared device does not need to receive and store the shared data, and generates only one data record, including an index that points to the same shared data that already exists and current source information. For example, when the first application A of the first user equipment S needs to share picture p1 with the second application B of the second user equipment T, if picture p1 already exists on the shared device, the shared device does not need to receive picture p1 from the first application A, and only needs to add one data record. The data record includes at least the following content: an identifier (or index information) of picture p1, a source device S, and a source application A.

Therefore, when the shared device sends the shared data corresponding to the two-dimensional code to the second application based on the data obtaining request, the sending module can further send the source information of the shared data corresponding to the two-dimensional code to the second application, so the second application can also obtain the source information of the shared data. When the second application obtains the shared data, the source information of the shared data can be displayed. Therefore, a user of the second application can clearly know the source of the shared data.

Figure 5:
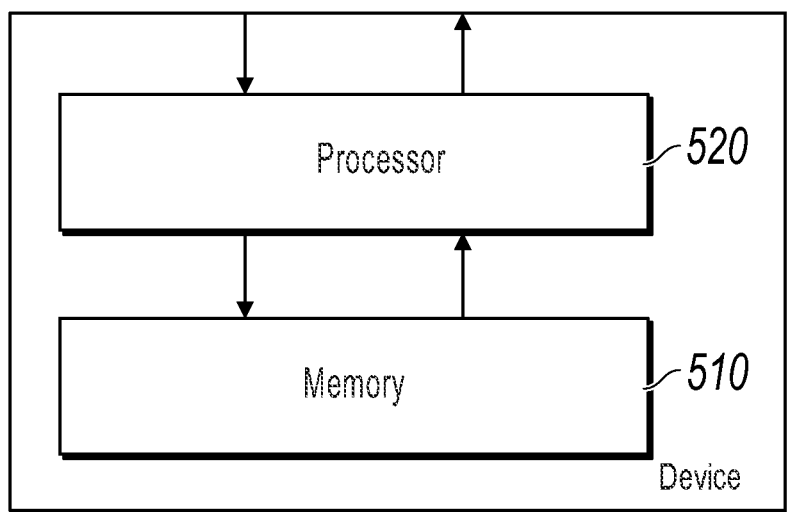
FIG. 5 is a schematic structural diagram illustrating a data sharing computing device, according to an implementation of the present application.

In addition, a part of the present application can be implemented as a computer program product, such as a computer program instruction. When the computer program instruction is executed by a computer, the methods and/or the technical solutions according to the present application can be invoked or provided by means of operations of the computer. In addition, the program instruction for invoking the method in the present application can be stored in a fixed or removable recording medium, and/or is transmitted by means of broadcast or a data flow in other signal bearer media, and/or is stored in an operating memory of a computer device that operates according to the program instruction. Here, some implementations of the present application include a computing device shown in FIG. 5. The device includes one or more memories 510 storing computer readable instructions and a processor 520 configured to execute the computer readable instructions. When the computer readable instructions are executed by the processor, the device executes the methods and/or technical solutions based on the previous multiple implementations of the present application.

In addition, some implementations of the present application further provide a computer readable medium on which computer program instructions are stored, and the computer readable instructions can be executed by a processor to implement the methods and/or technical solutions of the previous multiple implementations of the present application.

It is worthwhile to note that the present application can be implemented in software and/or a combination of software and hardware. For example, the present application can be implemented by using an application-specific integrated circuit (ASIC), a general purpose computer, or any other similar hardware device. In some implementations, a software program in the present application can be executed by a processor, so as to implement the previous steps and functions. Similarly, the software program in the present application (including a related data structure) can be stored in a computer readable recording medium, for example, a RAM memory, a hard disk drive or a DVD-ROM/CD-ROM drive, or a floppy disk and a similar device. In addition, some steps or functions in the present application can be implemented by using hardware, for example, a circuit that cooperates with the processor to execute the steps or the functions.

It is clear to a person skilled in the art that the present application is not limited to the details of the previous example implementations, and the present application can be implemented in another specific form without departing from the spirit or essential feature of the present application. Therefore, the implementations should be considered as illustrative and not restrictive in every aspect, and the scope of the present application is limited by the appended claims, rather than the above description. Therefore, the present application covers all changes within the meaning and the scope of the equivalent elements of the claims. Any reference numeral in the claims should not be considered as a limitation on the related claim. In addition, it is clear that the word "include" does not exclude another unit or step, and the singular does not exclude the plural. A plurality of units or apparatuses described in the apparatus claims can also be implemented by one unit or apparatus by using software or hardware. The words such as "first" and "second" are used to indicate names instead of any particular order.

What is claimed is:

1. A computer-implemented method comprising:
   obtaining, by a shared device from a first application running on a first device of a first user, an identifier of data to be shared with a second application running on a second device of a second user;
   determining, by the shared device, that pre-existing shared data on the shared device matches the data to be shared using the identifier of the data to be shared;
   responsive to determining that the pre-existing shared data on the shared device matches the data to be shared, generating, by the shared device, a two-dimensional code based on the pre-existing shared data;
   providing, by the shared device, the two-dimensional code to the first application;
   receiving, by the shared device, a data obtaining request from the second application running on the second device of the second user, wherein the data obtaining request is generated in response to the second application scanning the two-dimensional code presented by the first application on the first device; and
   sending, by the shared device to the second application of the second device, the data to be shared corresponding to the two-dimensional code provided to the first application on the first device.

2. The method of claim 1, further comprising:
   recording, by the shared device, source information of the data to be shared; and sending, by the shared device, the source information of the data to be shared corresponding to the two-dimensional code to the second application.

3. The method of claim 1, wherein the data to be shared is generated by the first application running on equipment of the first user before the shared device sends the data to be shared corresponding to the two-dimensional code to the second application based on the data obtaining request.

4. The method of claim 1, wherein determining that the pre-existing shared data on the shared device matches the data to be shared comprises:
comparing the identifier of the data to be shared with an identifier of the pre-existing shared data;
generating a result based on comparing the identifier of the data to be shared with the identifier of the pre-existing shared data; and
determining that the pre-existing shared data on the shared device matches the data to be shared based on the result.

5. The method of claim 4, wherein the identifier of the pre-existing shared data is a hash value of the pre-existing shared data.

6. The method of claim 1, wherein the identifier of the data to be shared is a first hash value of the data to be shared.

7. A non-transitory, computer-readable medium storing one or more instructions executable by a computer system to perform operations comprising:
obtaining, by a shared device from a first application running on a first device of a first user, an identifier of data to be shared with a second application running on a second device of a second user;
determining, by the shared device, that pre-existing shared data on the shared device matches the data to be shared using the identifier of the data to be shared;
responsive to determining that the pre-existing shared data on the shared device matches the data to be shared, generating, by the shared device, a two-dimensional code based on the pre-existing shared data;
providing, by the shared device, the two-dimensional code to the first application;
receiving, by the shared device, a data obtaining request from the second application running on the second device of the second user, wherein the data obtaining request is generated in response to the second application scanning the two-dimensional code presented by the first application on the first device; and
sending, by the shared device to the second application of the second device, the data to be shared corresponding to the two-dimensional code provided to the first application on the first device.

8. The non-transitory, computer-readable medium of claim 7, further comprising:
recording, by the shared device, source information of the data to be shared; and
sending, by the shared device, the source information of the data to be shared corresponding to the two-dimensional code to the second application.

9. The non-transitory, computer-readable medium of claim 7, wherein the data to be shared is generated by the first application running on equipment of the first user before the shared device sends the data to be shared corresponding to the two-dimensional code to the second application based on the data obtaining request.

10. The non-transitory, computer-readable medium of claim 7, wherein determining that the pre-existing shared data on the shared device matches the data to be shared comprises:
comparing the identifier of the data to be shared with an identifier of the pre-existing shared data;
generating a result based on comparing the identifier of the data to be shared with the identifier of the pre-existing shared data; and
determining that the pre-existing shared data on the shared device matches the data to be shared based on the result.

11. The non-transitory, computer-readable medium of claim 10, wherein the identifier of the pre-existing shared data is a hash value of the pre-existing shared data.

12. The non-transitory, computer-readable medium of claim 7, wherein the identifier of the data to be shared is a first hash value of the data to be shared.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a shared device from a first application running on a first device of a first user, an identifier of data to be shared with a second application running on a second device of a second user;
determining, by the shared device, that pre-existing shared data on the shared device matches the data to be shared using the identifier of the data to be shared;
responsive to determining that the pre-existing shared data on the shared device matches the data to be shared, generating, by the shared device, a two-dimensional code based on the pre-existing shared data;
providing, by the shared device, the two-dimensional code to the first application;
receiving, by the shared device, a data obtaining request from the second application running on the second device of the second user, wherein the data obtaining request is generated in response to the second application scanning the two-dimensional code presented by the first application on the first device; and
sending, by the shared device to the second application of the second device, the data to be shared corresponding to the two-dimensional code provided to the first application on the first device.

14. The system of claim 13, further comprising:
recording, by the shared device, source information of the data to be shared; and
sending, by the shared device, the source information of the data to be shared corresponding to the two-dimensional code to the second application.

15. The system of claim 13, wherein the data to be shared is generated by the first application running on equipment of the first user before the shared device sends the data to be shared corresponding to the two-dimensional code to the second application based on the data obtaining request.

16. The system of claim 13, wherein determining that the pre-existing shared data on the shared device matches the data to be shared comprises:
comparing the identifier of the data to be shared with an identifier of the pre-existing shared data;
generating a result based on comparing the identifier of the data to be shared with the identifier of the pre-existing shared data; and
determining that the pre-existing shared data on the shared device matches the data to be shared based on the result.

17. The system of claim 16, wherein the identifier of the pre-existing shared data is a hash value of the pre-existing shared data.

18. The system of claim 13, wherein the identifier of the data to be shared is a first hash value of the data to be shared.

* * * * *